Aug. 27, 1946.  J. L. LANDRUM  2,406,548
FLUID TRANSMISSION AND CLUTCH MEANS
Filed June 19, 1945  3 Sheets-Sheet 1
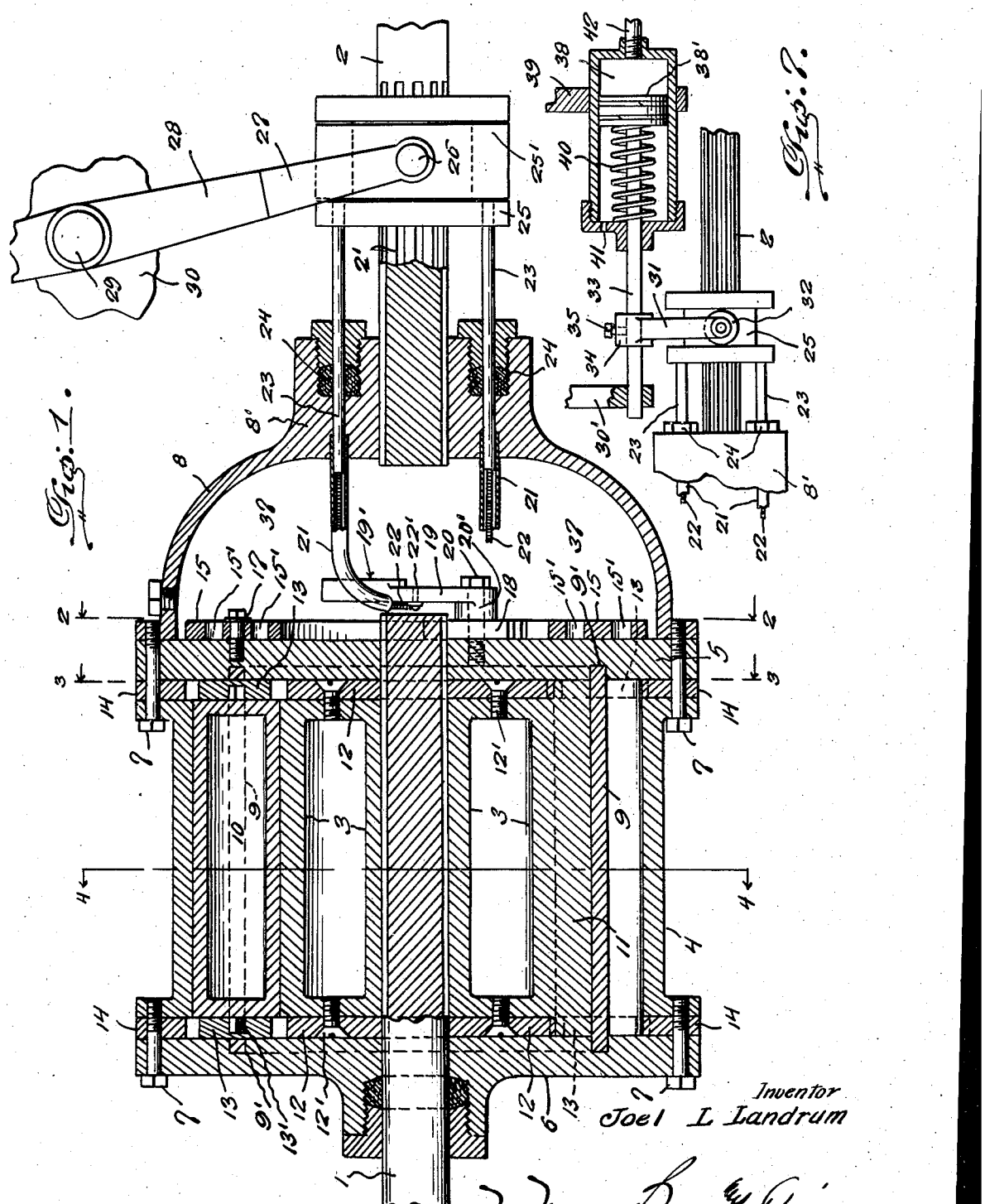
Inventor
Joel L Landrum
By
Attorneys

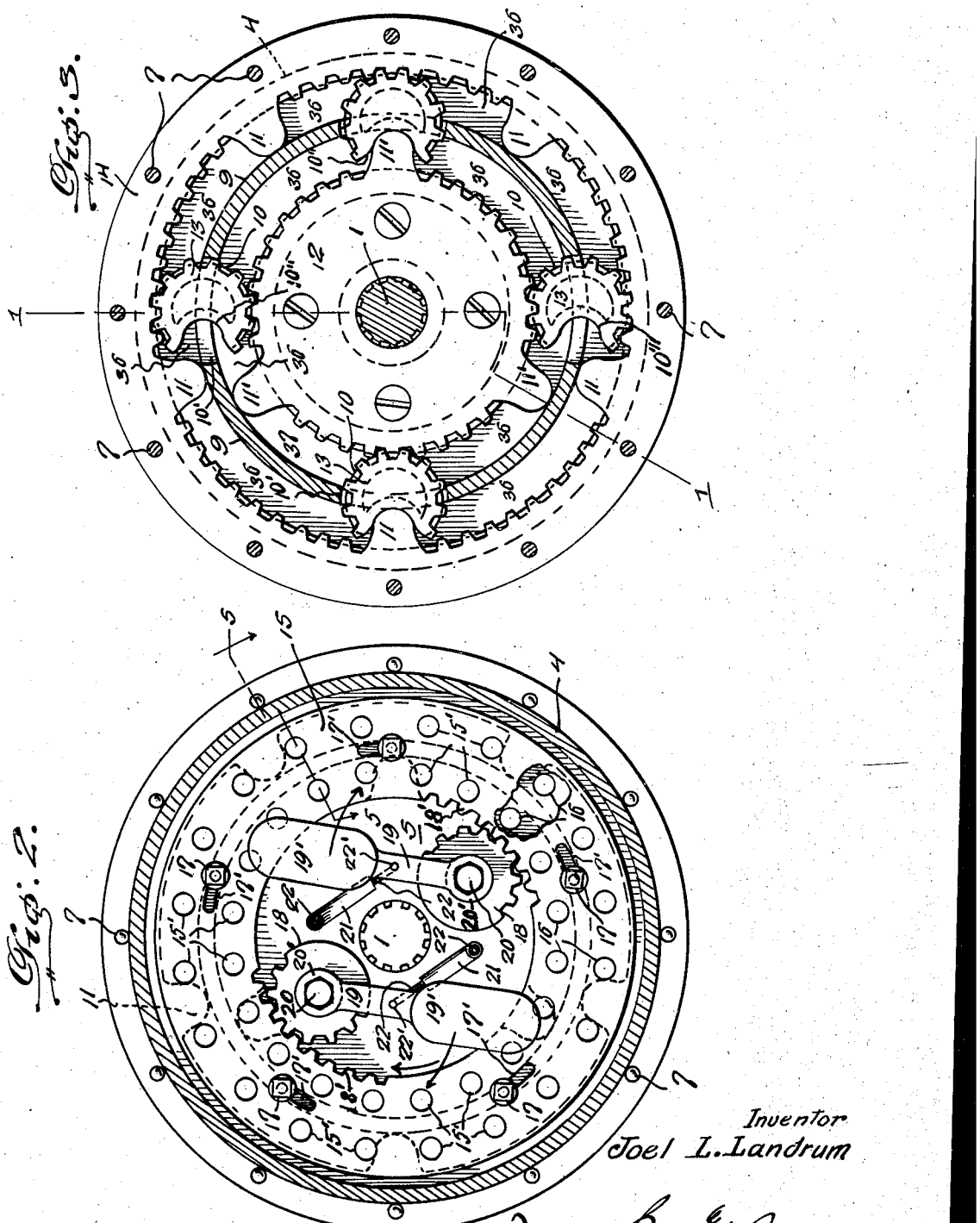

Aug. 27, 1946.   J. L. LANDRUM   2,406,548
FLUID TRANSMISSION AND CLUTCH MEANS
Filed June 19, 1945   3 Sheets-Sheet 3
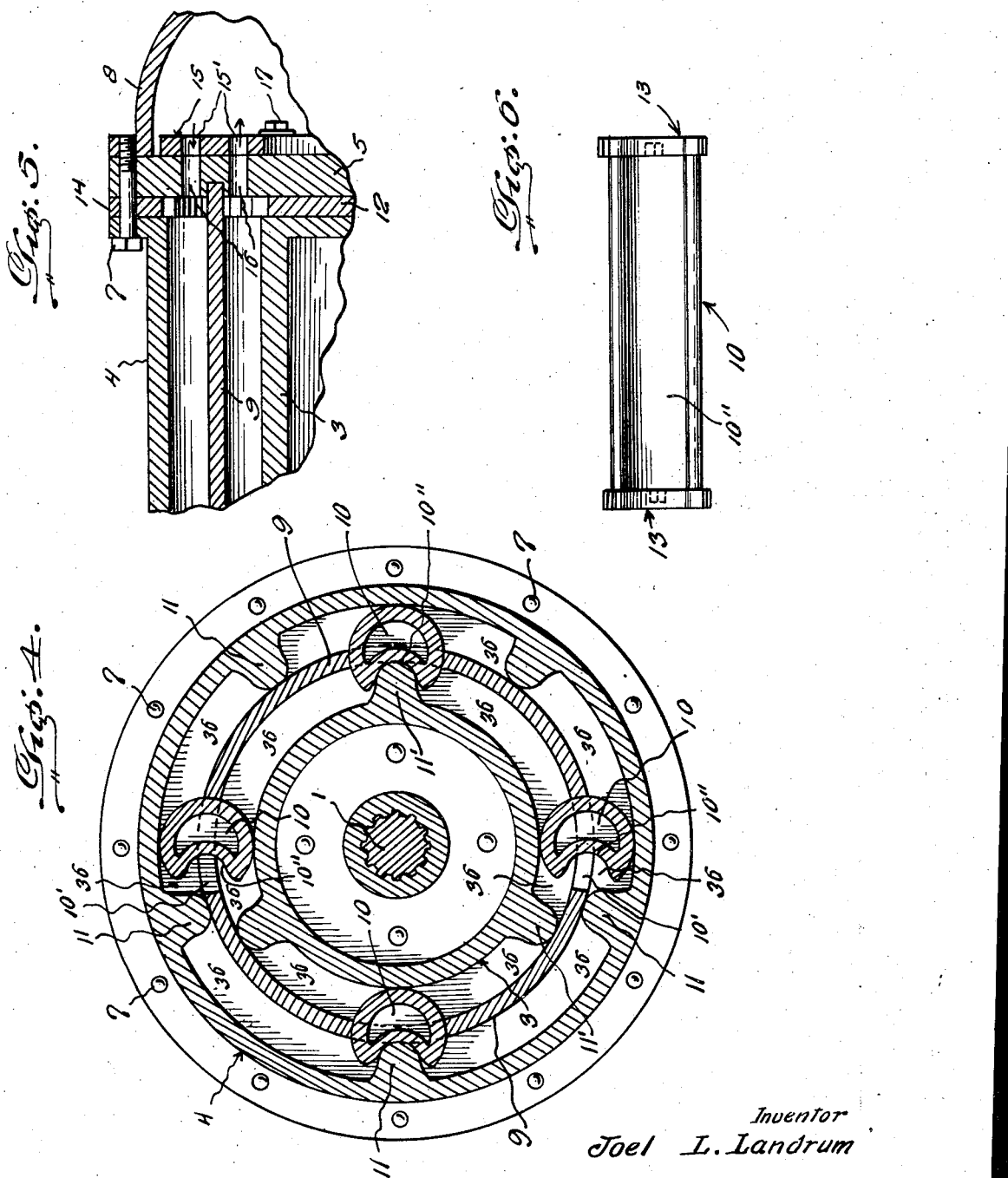
Inventor
Joel L. Landrum Patented Aug. 27, 1946

2,406,548

UNITED STATES PATENT OFFICE 2,406,548

FLUID TRANSMISSION AND CLUTCH MEANS

Joel L. Landrum, Clovis, N. Mex.

Application June 19, 1945, Serial No. 600,394

5 Claims. (Cl. 192—58)

This invention relates to speed changing fluid power transmission and clutch devices and has for one of its objects to improve generally upon such devices.

More specifically, another object is to produce a device of its kind of simple yet practical and durable construction, which is easy to manufacture, easy to control and operate, durable and long lasting, and operable without failures common to many devices of this character heretofore produced and in present-day use.

Other objects and advantages to be attained will hereinafter more fully appear in the following description.

A practical but non-limiting exemplification of the invention is illustrated in the accompanying drawings, in which:

Figure 1 is a longitudinal section of the device;

Figure 2 is a cross section taken on or about the line 2—2 of Figure 1;

Figure 3 is a section taken on or about the line 3—3 of Figure 1;

Figure 4 is a section taken on or about the line 4—4 of Figure 1;

Figure 5 is a fragmentary sectional view illustrating correlation of certain fluid passage and port arrangements at a time during the operation of the device;

Figure 6 is a face view of one of the abutment cylinders of the device; and

Figure 7 is a fragmentary view, more or less schematic in character, of a part of the controlling and shifting provision of the device.

Referring now to the drawings in detail, the numeral 1 designates a drive shaft and the numeral 2 a driven shaft.

Splined or otherwise secured on the drive shaft 1, so as to rotate therewith, is a hollow cylinder 3 which is closed throughout the entire extent thereof. An outside cylindrical shell 4 is placed so as to rotate concentrically about said inner shell 3, said outer shell being open at its opposite ends and said opposite open ends being provided with cylinder heads 5 and 6 which are respectively secured to the outer shell 4 by bolts 7.

The numeral 8 designates a separate end housing which is bolted to the cylinder head 5 by the same bolts 7 which secure the cylinder head to the adjacent end of the cylindrical shell 4.

A plain open-ended cylinder 9 is placed concentrically midway between the inner cylinder 3 and the outer shell 4, said cylinder 9 being somewhat longer than the inner cylinder 3 and outer shell 4 and its opposite end portions being fitted rotatably in annular grooves 9' formed in the inner face portions of said cylinder heads 5 and 6 concentrically with the axis of the driven shaft 1. The fitting of the end portions of the cylinder 9 in said annular grooves 9' is made relatively tight so as to permit rotation of the cylinder 9 in said grooves 9', yet the fitting is substantially leak-tight.

A plurality of partition and abutment cylinders 10 (four in number, as shown) are provided and arranged and adapted to rotate and roll between the inner cylinder 3 and outer shell 4, in a manner and for a purpose to be presently more fully described, said cylinders 10 being located to work in longitudinal openings 10' provided therefor in said intermediate cylinder 9.

Said partition or abutment cylinders 10 are made hollow as is the major inner cylinder 3, primarily for the purpose of lightening the structure without detracting from the strength thereof, and said cylinders 10, like the cylinder 3, are closed entirely throughout the extent thereof.

Formed on the inner face of the cylindrical wall of the outer shell 4 is a series of ribs 11 extending lengthwise thereof and disposed radially with respect to the axis of the driven shaft 1. On the circumferential face of the inner cylinder 3 is formed a series of radial ribs 11' which project radially with respect to the axis of the driven shaft 1, and both the ribs 11 and 11' are of similar cross sectional form, that is to say, they are tapered slightly towards their free edges and said free edge portions are rounded substantially semi-circular in cross section. In the operation of the device, as will be later more fully described, said ribs 11 and 11' alternately and sequentially enter and cooperate with longitudinally grooved portions 10" formed in one side of each of said partition or abutment cylinders 10. In operation of the device, the respective cylinders 3 and 10 and the outer shell 4 are rotated cooperatively in relation to each other. A practical means for effecting such rotation will now be described.

Secured coaxially on opposite ends of the inner cylinder 3 by means of screw elements 12' is a pair of like peripherally toothed gear discs 12, said gear discs 12 having their outer faces in abutting slidable contact with the adjacent inner face portions of said cylinder heads 5 and 6, respectively.

Each of said partition or abutment cylinders 10 has pinion discs 13 attached to its opposite ends, said discs 13 having central polygonal sockets which are fitted on counterpart polygonal members 13' so that the discs 13 rotate with the cylinders 10, and said pinion discs 13 being held in place on the cylinders 10 because said discs 13 are located in the spaces between the ends of the cylinders 10 and the adjacent inner face portions of the cylinder heads 5 and 6, the outer faces of said discs 13 being in slidable abutting contact with the adjacent face portions of said cylinder heads.

The respective pinion discs 13 are in substantially constant mesh with either the teeth of the gear discs 12 on the inner cylinder 3 or with internal teeth provided on an outer gear ring or annulus 14 which is interposed between the end portions of the outer cylindrical shell 4 and the respective cylinder heads 5 and 6, the pair of gear rings 14 being held in place by the aforesaid bolts 7 and with a leak-tight fitting between the adjacent end portions of said outer shell 4 and the companion cylinder heads 5 and 6.

By the foregoing provision and arrangement, upon rotation of the inner cylinder 3 rotation is imparted to the pinion discs 13 which turn the attached cylinders 10, and said pinion discs 13 are thereby caused to travel around the inner toothed peripheries of the gear rings 14 on said said outer shell 4, that is to say, when the device is idling as will be presently more fully described. In this connection, it is noted that in the travel of the cylinders 10 in their orbit between the outer shell 4 and the inner cylinder 3 the circumferential faces of said cylinders 10 are in contact with the opposed inner face of the outer shell 4 and circumference of the inner cylinder 3, the surface contact between the parts being with rolling contact effect.

The ratio of the gear elements 12, 13 and 14 is such that the operation of the parts is timed definitely for the cooperative entrance of the respective longitudinal ribs 11 and 11' on the elements 3 and 4 for effecting the pocketing and holding of a non-compressible fluid to prevent relative rotation of the outer shell 4 which is carried by the driven shaft and the inner cylinder 3 which is carried by the driving shaft when the device is set for clutching action and transmission of power from the driving shaft to the driven shaft as will be later more fully described.

In the illustrated exemplification of the invention, the inner cylinder 3 is of a diameter substantially three times that of each of the respective cylinders 10 and the outer cylindrical shell 4 is of a diameter substantially five times the diameter of each of the cylinders 10. The diameters of the gear elements 12, 13 and 14 are therefore correspondingly proportioned in diameter. In the illustration, four of the cylinders 10 are provided but in other adaptations of the invention there may be provided a greater or lesser number of said cylinders 10. In the illustration, there are provided five of the ribs 11 on the outer shell 4 and three of the ribs 11' are provided on the inner cylinder 3. Like the cylinders 10, the number of the ribs 11 and 11' may be varied in different adaptations of the invention.

Mounted on the outer face of the cylinder head 5 and enclosed within the adjacent end housing or casing 8 is a valve ring 15. This valve ring 15 is in the form of a flat annular plate of substantial width throughout the extent thereof and its outside diameter being just a little less than that of the interior peripheral portion of the housing or casing 8 where the same is attached to the cylinder head 5.

Said valve ring 15 is provided with two annular series of ports 15', there being in the illustration twenty of such ports in each of the two annular series and the respective ports being in radial pairs with respect to the axis of the driving shaft 1. Two corresponding annular series of ports 16 are provided in the adjacent cylinder head 5 (see Figures 2 and 5). The two series of ports 15' in the valve ring 15 are moved into and out of registration with the respective ports 16 in the cylinder head 5 by a slight rotative movement of said valve ring 15. For holding the valve ring 15 frictionally in its rotative position the same is provided with an annular series of segmental arcuate slots 17' through which screw studs 17 are inserted and fitted in screw threaded apertures provided therefor in the cylinder head 5.

A suitable provision is provided for imparting a partial rotation to said valve ring 15. As shown, the provision includes automatically operating elements of a centrifugal character together with selectively usable, manually or mechanically operable elements. As shown, the valve ring 15 is provided at diametrically opposite places on its interior periphery with a series of rack teeth 18'. Said rack teeth 18' are engaged by peripheral teeth on disc or sector elements 18 which are mounted rotatably on supporting studs 20 whose inner end portions are screw threaded and inserted in correspondingly threaded apertures provided therefor in the cylinder head 5 at points diametrically opposite the axis of the driving shaft 1. The disc or sector elements are provided with outwardly projected hub portions 20' having radial arms 19, the outer end portions of which arms are weighted, as at 19'.

Located within the housing or casing 8 and supported rigidly on the hub portion 8' of said housing is a pair of bent guide tubes 21 which support longitudinally movable therein a pair of flexible shafts 22. The free end portions of said tubes 21 terminate adjacent the respective arms 19 of said disc or sector elements 18 and the adjacent end portions of said flexible rods 22 are pivotally attached to the respective arms 19, as at 22'.

A pair of parallel operator stems 23 are provided to slide longitudinally in the hub portion 8' of said end housing or casing 8 of the device, the inner end portions of said operator stems 23 being slidable in the adjacent end portions of said guide tubes 21 and have the ends of the respective flexible rods 22 welded or otherwise rigidly attached thereto. The operator rods 23 slide through stuffing boxes or packing glands 24 provided therefor in the outer end portion of the hub portion of the housing or casing 8 and the outer end portions of said operator rods 23 are rigidly attached to the inner end portion of a shifter element 25 which is fitted longitudinally slidable on the key grooved portion 2' of the driven shaft 2, which key grooved portion 2' is provided on the shaft 2 for the attachment of the hub portion of the housing or casing 8 to the shaft and said key grooved portion being extended a substantial distance beyond the end of the hub portion of the housing or casing 8.

In some adaptations of the invention, as illustrated in Figure 1, the shifting of the shifter element 25 may be accomplished manually. As shown, the means for this accomplishment includes a collar 25' which is sleeved freely rotatable on the shifter element 25 and said collar 25' has a pivotal connection 26 with a yoke portion 27 of a hand lever 28 which is pivotally mounted, as at 29, on a suitable stationary support 30. By this particular provision, actuation of the lever 28 in one direction imparts a longitudinal movement of the flexible rods 22 inwardly and accordingly moves the arms 19 of the disc or sector elements 18 in the direction to correspondingly rotate the valve ring 15 in the direction to open the ports 15' thereof into communication with the ports 16 in the cylinder head 5, at which time the outer shell 4 of the device is stationary or the device is idling, that is to say, if the outer shell 4 is rotating no rotative movement is imparted to the inner cylinder 3 and its attached driven shaft 1.

Movement of the operating lever 28 in the opposite direction imparts a partial rotation of the valve ring 15 in the direction opposite to that in which it has just been operated, that is to say, in the direction to close the ports 16 in the cylinder head 5. By the provision for the manual operation of the valve ring 15, just above described, the valve ring remains in its operated position until reversely operated.

An example of a mechanical provision for controlling and operating the valve ring 15 is illustrated in Figure 7. In this illustration, the mechanism connecting directly with the valve ring itself and extending through the hub portion 8' of the housing or casing 8 and including the shifter element 25 is substantially the same as that illustrated in Figure 1. In place of the lever 28, however, there is provided a yoke element 31 having rollers 32 at the ends of the legs thereof which engage in the annular groove of the element 25. This yoke element 31 is carried on a reciprocatory rod 33, on which rod a central hub portion 34 of the yoke element 31 is adjustably secured by a set screw 35.

One end portion of the rod 33 slides through an aperture provided therefor in a stationary supporting element 30' which is located in proximity to the hub portion 8' of the housing or casing 8. The opposite end of the rod 33 is attached to a piston 38' which is slidable longitudinally within a cylinder 38, which latter is supported by a stationary support 39 which is mounted in opposed relation to said support 30'. The piston 38' is urged toward one end of the cylinder 38 by a spring 40 which is coiled about the rod 33 and interposed between the opposite end of the cylinder and said piston. A bleeder aperture 41 is provided in the cylinder head against which the spring 40 abuts. At the opposite end of the cylinder 38 an air supply pipe 42 is attached communicably, said pipe leading from a source of air under pressure (not shown). Obviously, instead of using compressed air for operating the piston 38' the same may be operated under other suitable fluid pressure. So, too, a suitable controlling valve or valves may be provided in said pipe 42, and the same being conventional and of any approved type it is deemed unnecessary to illustrate the same in detail herein.

In this modification for mechanical actuation of the valve ring 15, the idling position of the valve ring 15 is maintained under the normal influence of the spring element 40 against the piston 38' in the cylinder 38. That is to say, normally, the flexible rods 22 are retracted in the guide tubes 21 under the influence of the spring 40. Also, it is here noted that as to the manually operable lever 28, when said lever 28 is in the position shown in Figure 1 the valve ring 15 is in idling position.

For operation of the device, the several fluid chambers 36 within the cylindrical housing 4 of the device are filled with a non-compressible fluid and the chamber 37 within the end housing or casing 8, constituting a reserve supply chamber, is filled substantially to near the top thereof, or at least to a level above the uppermost port 15' in the valve ring 15. The relatively small air space in the chamber 37 is to contain sufficient air to permit expansion of the fluid under heat but in any case the level of the fluid in said chamber 37 must be high enough to cover the uppermost ports 15' in said valve ring 15 so that no appreciable amount of air, if any, is admitted into the chambers 36 within the cylindrical shell 4 of the device.

With the chambers 36 and 37 thus filled and with the valve ports 15' open to full communication with the ports 16 in the cylinder head 5, the driven shaft 2 and its attached inner cylinder 3 are rotatable freely without any effect on the outer cylindrical shell 4 and driving shaft 1. However, if the valve ring 15 is turned so as to close or partially close the ports 16 in the cylinder head 5 the fluid is confined in the respective chambers 36 and being so confined with the cylinders 10 in certain positions relative to the ribs 11 on the outer shell 4 and those 11' on the inner cylinder 3, and the rounded edge portions of said ribs 11 and 11' in wiping contact with the inner and outer faces of the intermediate sleeve 9, there is a substantial clutching effect caused whereby the rotation of the inner shell 3 causes a positive rotation of the outer cylinder 4 in the same direction.

To start operation of the transmission device in one way it is only necessary to first start rotation of the driving shaft 1 or else to first either manually operate the shifter element 25 by means substantially as shown in Figure 1 or through the mechanical operating means in Figure 7, in which latter case compressed air or other fluid pressure is admitted to the cylinder 38 so as to force the piston 38' forwardly and in turn move the shifter element 25 through the intermediary of the yoke element 31 carried on the rod 33. This actuation of the manual or mechanical controlling and operating means closes or partially closes the ports in the cylinder head 5 immediately to the degree desired and as soon as the inner cylinder 3 begins to rotate and turn with the shaft 1, which shaft has thereafter been started in rotation, the operation may continue without the use of either the manually or mechanically controlled means because of the provision of the weighted arms on the discs or sector elements 20 which have the gear toothed connection with the ratchet teeth on the ring valve 15 and thus keep the valve ring in port-closing position.

Another way of starting operating of the transmission device is to first start rotation of the drive shaft 1. Then, if there is not sufficient fluid resistance between the inner cylinder 3 and outer shell 4 to cause rotation of the outer shell at sufficient speed, if any, to cause operation of the centrifugal controlling element for a proper closing of the ports in the head wall 5, the ports may be closed or partially closed by manipulation of the aforesaid manually or mechanically operable elements.

It is here noted that, in some cases, the operation of the device of the present invention may be by utilization of the herein described driven shaft 2 as the driving shaft instead of the shaft 1 as described, and this without any appreciable change in construction and arrangement of parts, if any.

The device as herein disclosed, with the ports 16 in the cylinder head 5 fully opened or substantially so, is in condition for idling, that is to say, the outer cylindrical shell 4 is rotatable freely about the inner cylinder 3 and, of course, there is no driving of the shaft 2 by the shaft 1 or the shaft 1 by the shaft 2, as the case may be. However, by closing the ports 16 fully or nearly so, the clutching effect of the confined non-compressible fluid in the chambers 36 causes rotation of the inner cylinder 3 or the outer shell, the one by and with the other, so that the shaft 2 is driven by the shaft 1, or vice versa. Thus, if the ports 16 are fully closed there is no appreciable slippage or lost motion, if any, and the shaft 2 rotates at the same speed as the shaft 1, but if the ports are not closed tightly there is some bleeding of the fluid confined in the chambers 36 to an appreciable degree through the ports 16 into the fluid reserve supply chamber 37 so that the clutching effect on the inner cylinder 3 or the outer shell 4 is not definitely positive, or, in other words, there may be at times some displacement of the confined fluid resulting in an appreciable degree of lost motion, slippage and non-positive drive of the two shafts 1 and 2, the one by and with the other, and this is under control of the centrifugal governing and the manually manipulable and mechanically operable means.

The illustrated adaptation is but one practical exemplification of the invention. Therefore, the same admits of considerable modification within the scope of the appended claims. Hence, the invention is not limited to the specific construction and arrangement shown.

Having thus described the invention, what I claim is:

1. A fluid transmission clutch device, comprising a closed, hollow, cylindrical, main body shell having plain-faced head walls at its opposite ends, a closed, hollow, fluid reserve supply casing attached cooperatively endwise to said main body shell coaxially therewith and outside one of the head walls of the shell, a shaft secured at its end portion to the outer end of said fluid reserve supply casing whereby to rotate by and with the casing and the attached main body shell by rotation of the drive shaft, another shaft having its portion adjacent one end thereof extended axially through said main body shell and journaled rotatably in the opposite head walls of the shell, an inner cylinder mounted coaxially and fixedly on said second mentioned shaft to rotate therewith within said main body shell and being of a length so that its opposite ends terminate in narrow spaced relation to the head walls of the shell, peripherally toothed disc gears secured coaxially to the opposite ends of said inner cylinder, of a diameter substantially the same as that of the cylinder and filling the space between the ends of the cylinder and the adjacent head walls of the main body shell, internally toothed ring gears secured with leak-tight fitting between the opposite ends of the cylindrical portion of the main body shell and the peripheral portions of the adjacent head walls of the shell, an intermediate, open-ended, hollow cylinder disposed with its cylindrical wall spaced annularly and concentrically between the cylindrical walls of said main body shell and said inner cylinder with its opposite end portions fitted rotatably slidable in annular grooves provided therefor in said head walls of the main body shell, said intermediate cylinder having a plurality of annularly spaced longitudinal openings each of a definite width and length in the cylindrical wall thereof, a plurality of annularly spaced partition and abutment cylinders disposed with rotative fitting in the respective longitudinal openings of said intermediate cylinder and being each respectively of a diameter so as to roll in circumferential contact with the cylindrical walls of said main body shell and said inner cylinder, said partition and abutment cylinders being each of a length substantially the same as said inner cylinder and the interior of said main body shell, disc gears secured coaxially on the opposite ends of said partition and abutment cylinders each in mesh with one of the end disc gears of said inner cylinder and with one of said ring gears of said main body shell, whereby, without fluid resistance within said main body shell, rotation of said main body shell causes said partition and abutment cylinders to rotate and travel around said inner cylinder and rotation of the inner cylinder likewise causes rotation of said partition and abutment cylinders about the inside of said outer shell, thereby moving said intermediate cylinder rotatively therewith by the travel of said partition and abutment cylinders on said inner cylinder and around the inside of said outer shell, but, when the fluid is confined and held without escape in the main body shell, said partition and abutment cylinders and said inner cylinder are held from independent movement and in a substantially fixed relation to said main body shell so that rotation of said inner cylinder or said main body shell thereby causes rotation of one of said shafts by the other shaft, the head wall of said main body shell next adjacent to said fluid supply casing having annular series of port apertures therethrough, a ring valve member secured partially rotative on the outer face of said apertured head wall of the main body shell in covering relation to the annular series of port apertures in said head wall, said ring valve member having complemental annular series of port apertures to register with the port apertures of the head wall upon rotative positioning of the ring valve member in one direction but the ring valve member closing said wall port apertures upon rotative positioning of the ring valve member in the opposite direction, centrifugal means for moving said ring valve member automatically to port-closing position by rotative movement of said main body shell, and separate co-active means for selectively moving said ring valve member to port opening and closing positions at the will of an operator.

2. A fluid transmission clutch device, comprising a closed, hollow, cylindrical, main body shell having head walls at its opposite ends, a closed, hollow, fluid reserve supply casing attached cooperatively endwise to said main body shell coaxially therewith and outside one of the head walls of the shell, a shaft secured at its end portion to the outer end of said fluid reserve supply casing whereby to rotate by and with the casing and the attached main body shell, another shaft having its portion adjacent one end thereof extended axially through said main body shell and journalled rotatably in the opposite head walls of the shell, an inner cylinder mounted coaxially and fixedly on said second mentioned shaft to rotate by and with each other within said main body shell, an intermediate cylinder mounted freely rotatable within said main body shell concentrically with relation to said shell and said inner cylinder and constituting an annular partition wall between said main body shell and said inner cylinder, said intermediate cylinder being provided with a plurality of annularly spaced longitudinal openings of substantial width therein, a plurality of rotatable partition and abutment cylinders disposed rotatably within said longitudinal openings of the intermediate cylinder and being adapted to substantially close said longitudinal openings, said main body shell having an annular spaced plurality of internal radial ribs extending longitudinally thereof, the inner edge portions of said ribs arranged and adapted to ride in wiping contact with the outer peripheral face of said intermediate cylinder, said inner cylinder having a plurality of annularly spaced ribs extending lengthwise of the circumferential face thereof with the outer edge portions of said last named ribs arranged and adapted to ride in wiping contact with the interior cylindrical surface of said intermediate cylinder, said partition and abutment cylinders each having a longitudinally recessed portion to alternately and successively receive said longitudinally ribbed portions of said main body shell and said inner cylinder, said main body shell, said partition and abutment cylinders, and said inner cylinder having geared provision between them whereby, upon rotation of said main body shell free of fluid resistance therein, said partition and abutment cylinders are rotated positively by the rotation of said main body shell so as to travel around said inner cylinder and moving said intermediate cylinder rotatively therewith or by rotation of said inner cylinder said partition and abutment cylinders are caused to travel around the inside of said outer shell with the same operative effect of said intermediate cylinder, the head wall of said main body shell between the shell and said fluid reserve supply casing being provided with annular series of port openings therethrough, a ring valve member secured partially rotative on said head wall within said fluid reserve supply casing, said ring valve member having annular series of port apertures therethrough so that, in one rotative position of said ring valve member, the port openings thereof register with the port openings of the head wall so as to eliminate fluid resistance within the main body shell to permit the aforesaid rotation of either the main body shell or the said inner cylinder and the free travel of the partition and abutment cylinders around said inner cylinder or around the inside of said outer shell, but, upon opposite rotative positioning of said ring valve member, the port openings thereof and the port openings of said head wall are closed whereby to confine and hold fluid within said main body shell and upon the occurrence of which said partition and abutment cylinders, intermediate cylinder and inner cylinder are held from independent movement and in a substantially fixed relation to said main body shell so that rotation of said main body shell or said inner cylinder thereby causes rotation of one of said shafts by and with the other, centrifugal means for moving said ring valve member automatically in the direction to close the port openings in the ring valve member and in the head wall during rotation of the main body shell, and separate coactive means for selectively moving said ring valve member to port opening and closing positions at the will of an operator.

3. A fluid transmission clutch device as set forth in claim 2, wherein the ring valve member is provided with internal rack teeth, and the centrifugal controlling and operating means includes at least one peripherally toothed disc mounted rotatably on the adjacent portion of the head wall in mesh with the rack portion of the ring valve member and said toothed disc is provided with a weighted radial arm, the separate coactive means for selectively moving said ring valve member being attached cooperatively to the radial weighted arm of said toothed disc of the centrifugal means.

4. A fluid transmission clutch device as set forth in claim 2, wherein the ring valve member is provided with internal rack teeth, and the centrifugal controlling and operating means includes a pair of diametrically opposed toothed discs mounted rotatably on the adjacent portion of the head wall and in mesh with the internal rack portion of the ring valve member, the toothed discs having opposed, oppositely directed and normally parallel weighted radial arms, and said separate coactive means for selectively moving said ring valve member including a pair of opposed guidably supported flexible rods, said flexible rods having companion parallel rigid operating rods mounted slidably through the fluid reserve supply casing in parallel relation to the attached shaft and said operating rods being rigidly attached to a shifter element movable longitudinally on said driving shaft but fixed to rotate therewith, and means for moving said shifter element in opposite directions at the will of an operator.

5. A fluid transmission clutch device, comprising a closed, hollow, cylindrical, main body shell having head walls at its opposite ends, a closed, hollow, fluid reserve supply casing attached cooperatively endwise to said main body shell coaxially therewith and outside one of the head walls of the shell, a shaft secured at its end portion to the outer end of said fluid reserve supply casing whereby to rotate by and with the casing and the attached main body shell, another shaft having its portion adjacent one end thereof extended axially through said main body shell and journaled rotatably in the opposite head walls of the shell, an inner cylinder mounted coaxially and fixedly on said second mentioned shaft to rotate therewith within said main body shell, an intermediate cylinder mounted freely rotatable within said main body shell concentrically with relation to said shell and said inner cylinder and constituting an annular partition wall between said main body shell and said inner cylinder, said intermediate cylinder being provided with a plurality of annularly spaced longitudinal openings of substantial width therein, a plurality of rotatable partition and abutment cylinders disposed rotatably within said longitudinal openings of the intermediate cylinder and in certain rotative positions of the same being adapted to close said longitudinal openings, said main body shell having an annularly spaced plurality of internal radial ribs, the inner edge portions of which ride in wiping contact with the outer peripheral face of said intermediate cylinder, said inner cylinder having a plurality of annularly spaced ribs extending lengthwise of the circumferential face thereof with the outer edge portions of said ribs riding in wiping contact with the interior cylindrical surface of said intermediate cylinder, said partition and abutment cylinders each having a longitudinally recessed portion to alternately and successively receive said longitudinally ribbed portions of said main body shell and said inner cylinder, said main body shell, said partition and abutment cylinders, and said inner cylinder having geared provision between them whereby, upon rotation of said main body shell or said inner cylinder free of fluid resistance thereupon, said partition and abutment cylinders are rotated positively by the rotation of said main body shell so as to travel around said inner cylinder and moving rotatively therewith said intermediate cylinder or by rotation of said inner cylinder the partition and abutment cylinders are similarly rotated with substantially the same operative effect of said intermediate cylinder, there being provided a fluid passage between said main body shell and said fluid reserve supply casing, and controlling means for opening and closing said fluid passage.

JOEL L. LANDRUM.